March 2, 1965 R. HATSCHEK 3,171,989
PIEZOELECTRIC GAUGE
Filed Sept. 30, 1960
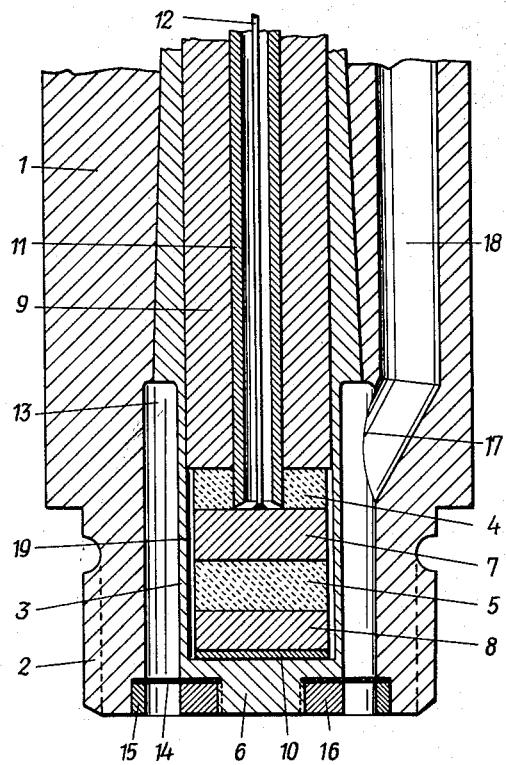
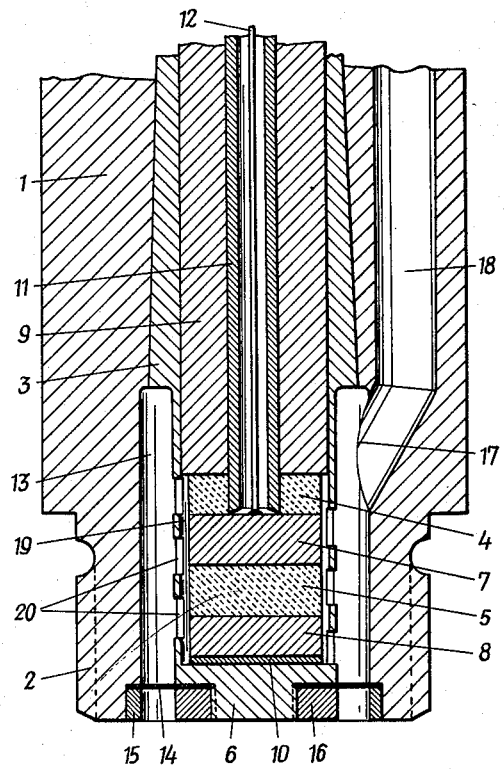
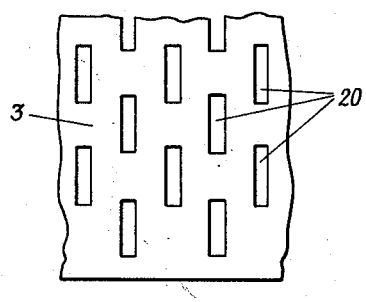
Inventor
Rudolf Hatschek
By
Watson, Cole, Grindle + Watson
Attys.

United States Patent Office 3,171,989
Patented Mar. 2, 1965

3,171,989
PIEZOELECTRIC GAUGE
Rudolf Hatschek, Vienna, Austria, assignor to
Hans List, Graz, Austria
Filed Sept. 30, 1960, Ser. No. 59,731
Claims priority, application Austria, Oct. 2, 1959
A 7,171/59
6 Claims. (Cl. 310—8.7)

The invention relates to a piezoelectric gauge, in particular for measuring the pressure in cylinders of internal combustion engines, comprising a casing and a sleeve attached thereto, said sleeve enclosing the piezoelements, an annular gap being provided for insulation purposes between the piezoelements and the surface of said sleeve.

In conventional piezoelectric gauges of this type the electric charges produced at the polished outer surfaces of the piezoelements are collected by metal electrodes applied thereon and leaked off the latter via an insulated line on the one hand and over the body of the gauge on the other hand. For the purpose of insulating the piezoelements and the ungrounded electrode an annular air gap has been provided between the said electrode and the surface of the sleeve enclosing same. Experience goes to show that the moisture contained in the air will condense on the piezoelements and the electrodes during the operation of the piezoelectric gauge and after. This will not only increase the contact resistance between the piezoelements and the electrodes but also cancel the good insulating quality of the polished surfaces of the piezoelements. Besides, the sides of the piezoelements will develop creepage paths which tend to equalize the charges produced on the polished surfaces of the piezoelements. This in turn leads to disturbances liable to impair the sensitivity and accuracy of the piezoelectric gauge.

To overcome these disadvantages it has already been suggested to incorporate some hygroscopic substance in the sleeve. However, this requires complicated devices since such a measure impedes the clamping of the piezoelements by the sleeve. Moreover, the results thus obtained were not always quite satisfactory.

Instead it is proposed according to the invention to fill the annular gap with a highly insulating polymer. Experiments have shown that this will in no way impair the sensitivity and accuracy of the piezoelectric gauge, both properties being maintained even during long periods of operation or storage, nor has the air to be conditioned as with the conventional design featuring the annular air gap. A further advantage achieved by this method resides in the fact that the highly insulating polymer will act as a vibration absorber thus attenuating or eliminating objectionable natural vibrations of the piezoelectric gauge.

According to a further embodiment of the invention the annular gap may be filled with polytetrafluoro ethylene. This highly insulating polymer, the trade name of which is "Teflon," is a gelatinous substance of such plastic and elastic properties as are required for the invention. Experiments have shown that in piezoelectric gauges of this type, natural vibrations are suppressed to a very large extent.

According to yet another embodiment of the invention the annular gap is filled with a liquid polymer, preferably silicon oil. This is an insulating liquid that can be easily introduced in the annular gap, acting additionally as a lubricant for the assembly of the piezoelectric gauge where very close tolerances are called for.

According to a further embodiment of the invention, the sleeve of a piezoelectric gauge having an annular chamber located at least in the area of the pressure-loaded end of the sleeve between the latter and the casing, said annular chamber being at least in part situated in the area of the annular gap and traversed by the cooling liquid consisting of a highly insulating polymer such as silicon oil, may be perforated in the area of the annular gap. This provides a communication between the cooling system and the annular gap surrounding the piezoelements, with the consequent improvement, in addition to effective insulation, of the cooling effect, as there is a continuous change of insulating liquid going on in the annular gap. Moreover, it is possible by means of these perforations to obtain sufficient elasticity even in sleeves of greater wall thickness, which offers certain advantages in production.

According to a preferred embodiment of the invention, axial slots arranged in staggered relation in a circumferential direction are provided in the sleeve. These slots are easy to produce, provide sufficient elasticity for the sleeve and will not impair the solidity of the sleeve.

The accompanying drawing illustrates an embodiment of the invention.

FIGURES 1 and 2 are longitudinal cross-sections of the pressure side of two different embodiments of the piezoelectric gauge, and FIGURE 3 a detail of FIGURE 2 on an enlarged scale.

Inside the casing 1 presenting at its lower end a thread 2 for the screwed connection of same to the cylinder head of an internal combustion engine for example, a sleeve 3 is clamped down, enclosing the piezoelements, for example, two quartz crystals 4 and 5, and closed by a head 6 serving for the transfer of the pressure to be measured. The quartz crystals 4 and 5 are arranged one above the other and opposing each other, an electrode 7 being provided between them for the purpose of leaking off the positive charges for example, whereas the negative charges are allowed to leak off via the body of the gauge. For that purpose, an electrode 8 is provided on one side of the quartz crystals and a steel cylinder 9 on the other side, said steel cylinder being connected to the quartz crystal 4 and serving also for the clamping of the quartzes. The electrode 8 adjoining the quartz crystal 5 is conductively connected with the head 6 and consequently, also with the sleeve 3 and the casing 1 through a layer 10 of some soft metal such as aluminum. The purpose of the metal layer 10 is to provide an electric contact with a minimum of contact resistance between the electrode 8 and the head 6. Inside the steel cylinder 9 an insulating tube 11 is located which encloses the electric wire leading from the electrode 7 outside.

Recessed around the portion of the sleeve 3 enclosing the quartz crystals 4 and 5 is an annular chamber 13 located between said sleeve and the casing 1, said annular chamber being closed at the head end by a sealing membrane 14 located between the casing 1 and the head 6 and maintained in position by means of rings 15 and 16. In the upper section of the annular chamber 13 an inlet and an outlet opening is provided (of which only one, designated by reference number 17, is shown in the drawing) through which the cooling liquid is admitted to or discharged from the annular chamber 13 via ducts 18 in the casing 1.

Between the quartz crystals 4 and 5 and the electrodes 7 and 8 on the one hand, and the sleeve 3 enclosing the same on the other hand, an annular gap 19 is provided for insulation purposes and filled with a highly insulating polymer. In the embodiment shown in FIGURE 1 the annular gap 19 is sealed against the annular chamber 13, while in FIGURE 2 the sleeve 3 is perforated by slots 20 for example, in the area of the annular gap 19. This provides a communication between the annular gap 19 and the annular chamber 13 which is part of the cooling system, the cooling means being a liquid polymer such as silicon oil which also serves as an insulation.

FIGURE 3 shows by way of example a design of the slots 20 provided in the sleeve 3. These slots extend in axial direction and are arranged in staggered relation in a circumferential direction of the sleeve. Particular care should be used in the arrangement of said slots which must not impair the solidity and elasticity of the sleeve.

I claim:

1. A piezoelectric pressure transducer, particularly for measuring pressure variations in the cylinders of internal combustion engines, comprising a casing, disk-shaped piezoelements in said casing, a head in said casing for transmitting pressure to the said piezoelements, a sleeve in said casing terminated by the said head and enclosing the said piezoelements, an annular gap being provided between the said sleeve and the said piezoelements, said gap being filled with a highly insulating polymer, and an annular chamber formed between the said sleeve and the casing and traversed by a cooling liquid.

2. A piezoelectric pressure transducer according to claim 1, wherein the annular gap is filled with polytetrafluoro ethylene.

3. A piezoelectric pressure transducer according to claim 1, wherein the annular gap is filled with a liquid polymer.

4. A piezoelectric pressure transducer according to claim 1, wherein the annular gap is filled with a liquid polymer which is silicon oil.

5. A piezoelectric transducer according to claim 1, wherein the said annular chamber is located at least partially in the area of the said annular gap, the said sleeve having perforations in the area of the said annular gap, the said annular chamber being filled with a cooling liquid consisting of a highly insulating liquid polymer.

6. A piezoelectric transducer according to claim 1, wherein the said annular chamber is located at least partially in the area of the said annular gap, the said sleeve having perforations in the area of the said annular gap, the said annular chamber being filled with a cooling liquid consisting of a highly insulating liquid polymer consisting of silicon oil.

References Cited in the file of this patent

UNITED STATES PATENTS

| | | |
|---|---|---|
| 2,498,737 | Holden | Feb. 28, 1950 |
| 2,507,636 | Kistler | May 16, 1950 |
| 2,571,899 | Kroft et al. | Oct. 16, 1951 |
| 2,636,134 | Arons et al. | Apr. 21, 1953 |
| 2,701,392 | Eich | Feb. 8, 1955 |
| 2,703,848 | Kistler | Mar. 8, 1955 |
| 2,842,686 | Musser et al. | July 8, 1959 |
| 2,949,640 | Collins et al. | Aug. 23, 1960 |

FOREIGN PATENTS

| | | |
|---|---|---|
| 1,031,155 | France | June 22, 1953 |